(12) United States Patent
Zhou et al.

(10) Patent No.: US 12,118,780 B2
(45) Date of Patent: Oct. 15, 2024

(54) POINTEFF METHOD FOR URBAN OBJECT CLASSIFICATION WITH LiDAR POINT CLOUD DATA

(71) Applicant: GUILIN UNIVERSITY OF TECHNOLOGY, Guilin (CN)

(72) Inventors: Guoqing Zhou, Guilin (CN); Yue Jiang, Guilin (CN); Haoyu Wang, Guilin (CN)

(73) Assignee: GUILIN UNIVERSITY OF TECHNOLOGY, Guilin (CN)

( * ) Notice: Subject to any disclaimer, the term of this patent is extended or adjusted under 35 U.S.C. 154(b) by 0 days.

(21) Appl. No.: 18/352,246

(22) Filed: Jul. 14, 2023

(65) Prior Publication Data
US 2024/0020970 A1    Jan. 18, 2024

(51) Int. Cl.
*G06V 20/10*    (2022.01)
*G06T 7/11*    (2017.01)
(Continued)

(52) U.S. Cl.
CPC .............. *G06V 20/176* (2022.01); *G06T 7/11* (2017.01); *G06V 10/764* (2022.01);
(Continued)

(58) Field of Classification Search
CPC ............... G06V 20/176; G06V 10/764; G06V 10/7715; G06V 10/806; G06V 10/95;
(Continued)

(56) References Cited

U.S. PATENT DOCUMENTS 10,916,014 B2 * 2/2021 Kusari ................... G06V 20/584
11,074,447 B1 * 7/2021 Fox .......................... G06N 3/08
(Continued)

FOREIGN PATENT DOCUMENTS

WO    2021232463 A1    11/2021

OTHER PUBLICATIONS

Niemeyer, J. "Conditional Random Fields for Lidar Point Cloud Classification in Complex Urban Areas" ISPRS Annals of the Photogrammetry, Remote Sensing and Spatial Information Sciences, vol. 1-3, 2012 XXII ISPRS Congress, Aug. 25-Sep. 1, 2012, Melbourne, Australia (Year: 2012).*

(Continued)

*Primary Examiner* — Mia M Thomas
(74) *Attorney, Agent, or Firm* — Platinum Intellectual Property

(57) ABSTRACT

The present disclosure relates to a PointEFF method for urban object classification with LiDAR point cloud data, and belongs to the field of LiDAR point cloud classification. The method comprises: point cloud data segmentation; End-to-end feature extraction layer construction; External feature fusion layer construction; and precision evaluation. The PointEFF method for urban object classification with LiDAR point cloud data fuses point cloud hand-crafted descriptors with End-to-end features obtained from a network at an up-sampling stage of a model by constructing an External Feature Fusion module, which improves a problem of local point cloud information loss caused by interpolation operation in the up-sampling process of domain feature pooling methods represented by PointNet and PointNet++, greatly improves classification precision of the model in complex ground features, especially in rough surface ground features, and is capable of being better applied to the classification of urban ground features with complex ground feature types.

2 Claims, 4 Drawing Sheets

(51) Int. Cl.
*G06V 10/764* (2022.01)
*G06V 10/77* (2022.01)
*G06V 10/80* (2022.01)
*G06V 10/94* (2022.01)

(52) U.S. Cl.
CPC ........ *G06V 10/7715* (2022.01); *G06V 10/806* (2022.01); *G06V 10/95* (2022.01); *G06T 2207/10028* (2013.01); *G06T 2207/20081* (2013.01); *G06T 2207/30181* (2013.01)

(58) Field of Classification Search
CPC .......... G06V 20/58; G06V 10/82; G06T 7/11; G06T 2207/10028; G06T 2207/20081; G06T 2207/30181; G06N 3/08
See application file for complete search history.

(56) References Cited

U.S. PATENT DOCUMENTS

| | | | |
|---|---|---|---|
| 11,361,484 B1* | 6/2022 | Peterson | G06T 7/11 |
| 2010/0150431 A1* | 6/2010 | Chen | G06V 20/176 382/154 |
| 2013/0218472 A1* | 8/2013 | Fu | G06V 20/176 702/5 |
| 2016/0093101 A1* | 3/2016 | Benedek | G06V 20/64 345/420 |
| 2018/0364717 A1* | 12/2018 | Douillard | G01S 17/931 |
| 2019/0147245 A1 | 5/2019 | Qi et al. | |
| 2019/0178974 A1* | 6/2019 | Droz | G01S 7/4815 |
| 2019/0258737 A1* | 8/2019 | Wang | G06F 16/2379 |
| 2020/0160559 A1* | 5/2020 | Urtasun | G06T 7/55 |
| 2020/0226375 A1* | 7/2020 | Albrecht | G01J 3/2823 |
| 2021/0004613 A1* | 1/2021 | Yang | G06V 10/454 |
| 2021/0012116 A1* | 1/2021 | Urtasun | G06F 18/2155 |
| 2021/0063578 A1* | 3/2021 | Wekel | G01S 17/894 |
| 2021/0101286 A1* | 4/2021 | Lee | B25J 13/08 |
| 2022/0113423 A1* | 4/2022 | Yang | G06V 20/176 |
| 2022/0189070 A1* | 6/2022 | Rejeb Sfar | G06T 9/002 |
| 2022/0262097 A1* | 8/2022 | Yao | G06T 7/00 |
| 2022/0383640 A1* | 12/2022 | Vora | G06V 10/40 |
| 2023/0206653 A1* | 6/2023 | Sebastian | G01S 17/89 702/3 |
| 2024/0112462 A1* | 4/2024 | Rentz | G01S 7/4808 |
| 2024/0212189 A1* | 6/2024 | Cavallari | G06V 10/82 |

OTHER PUBLICATIONS

First office action of the counterpart Chinese patent application No. 202210838080.2, dated Feb. 18, 2024.

Hu et al. "Airborne LiDAR Point Cloud Classification Based on Multiple-Entity Eigenvector Fusion", Chinese Journal of Lasers, vol. 47, No. 8; Aug. 2020, Abstract Only.

Wang et al., "3D Deep Learning Classification Method for Airborne LiDAR Point Clouds Fusing Spectral Information", Laser & Optoelectronics Progress, vol. 57, No. 12, Jun. 2020, Abstract Only.

Zhang et al., "Point Cloud Classification Based on Point Feature Histogram", Journal of Computer-Aided Design & Computer Graphics, vol. 28 No. 5, May 2016, Abstract Only.

* cited by examiner (a)MiniLille1

(c)MiniParis1_1

(b)MiniLille2

MiniParis1_2

POINTEFF METHOD FOR URBAN OBJECT CLASSIFICATION WITH LiDAR POINT CLOUD DATA

TECHNICAL FIELD

The present disclosure relates to the technical field of LiDAR point cloud classification, and more particularly, to a PointEFF (Point cloud External Feature Fusion Network) method for urban object classification with LiDAR point cloud data.

BACKGROUND

Obtaining urban feature information from high-precision 3D LiDAR point cloud data timely and accurately and classifying urban ground features have become international research hotspots. At present, a LiDAR point cloud classification task is generally divided into two steps: extracting representative point features from local and global; and using the obtained features to divide each point into pre-defined semantic categories. Because the point cloud data of urban ground features has the characteristics of large amount of data and complex scenes, it is particularly critical to design a classification method that can obtain rich point cloud features.

As for point cloud classification methods, features are extracted mainly by using manually designed rules in early research, and semantic categories of each point are predicted by using machine learning methods such as Support Vector Machine (SVM), Random Forest (RF) and the like. These methods cannot achieve satisfactory results in the face of complex scenes due to the limitations of manually designed rules to extract features. With the rise of deep learning, researchers gradually consider to process problems related to point cloud data based on deep learning, but due to the disorder characteristic of point cloud, an early deep learning-based method generally regularizes the point cloud into two-dimensional images or voxel grids and then classifies the two-dimensional images or the voxel grids, such as MVCNN, CVGNN, VoxNet, Kd-Net, and the like, and the method of converting three-dimensional data into two-dimensional data and then processing the two-dimensional data cannot fully utilize the characteristic of the point cloud data.

Domain feature pooling methods represented by PointNet and PointNet++ abandon the manner of firstly regularizing and then processing the point cloud, creates a pioneer in directly processing the original point cloud, solves the problems of point cloud disorder, displacement invariance and rotation invariance with lower cost and better effect. For example, a wolfberry recognizing and counting method based on a PointNet++ network with the application number of CN109410238A utilizes the PointNet++ network to fuse context information, and realizes recognizing and counting of the wolfberry quantity. A point cloud classification method based on point cloud semantic labeling and optimization, with the application number CN110210431A, uses PointNet++ to pre-classify original point clouds. The domain feature pooling methods achieve excellent effects on the problem of classifying point cloud data sets in a small scene and a small range, but have the following defects in the aspect of the problem of classifying urban ground features with complex scenes and huge data quantity:

1. After the characteristics of each point of the point cloud are obtained, local region characteristics of the point cloud are represented by the characteristics of a certain point in a pooling mode. Although pooling can reduce a size of a model and increase a computation speed, it is necessary to lose useful information in a local region when the model is faced with a classification object rich in spatial information.
2. The domain feature pooling methods adopt an interpolation mode to recover the spatial dimension of the point cloud in the up-sampling process, uses the characteristics of a few sampling points to describe the characteristics of the local region, can obtain better effect in the face of a classification task of a simple scene, but is more laborious in the face of a classification task of a complex scene, particularly a rough surface scene.
3. The domain feature pooling methods lack the extraction of structure information between points.

SUMMARY

In order to solve the above technical problems, the present disclosure provides a new PointEFF (Point cloud External Feature Fusion Network) method for urban object classification with LiDAR point cloud data, the main idea of which is to fuse hand-crafted descriptors with End-to-end features obtained from domain feature pooling in an up-sampling stage of a model, and construct an External Feature Fusion module. The PointEFF method for urban object classification with LiDAR point cloud data solves a defect that a traditional domain feature pooling method based on deep learning does not consider structural information between points when extracting point cloud local features, improves a problem of local point cloud information loss caused by interpolation operation in the up-sampling process of the traditional domain feature pooling method based on deep learning, and greatly improves classification precision of the model in complex ground feature classification, especially in rough surface classification.

Considering that the Fast Point Feature Histogram has the advantages of simple extraction, strong robustness to noise and density changes, and rich geometric structure information, the Fast Point Feature Histogram is selected as an input of the External feature fusion module in the method. The present disclosure can be achieved by using the following technical solutions:

step 1: point cloud data segmentation;
step 2: PointEFF End-to-end feature extraction construction;
step 3: PointEFF External feature fusion layer construction; and
step 4: point cloud data input to obtain a point cloud category label and carry out precision evaluation.

Further, the data segmentation in the step 1 comprises the following steps:
because a number of points in each batch processed by a network is limited, using a simplified density clustering (DBSCAN) algorithm to cluster and segment the data according to the number of points, and then inputting the data into the network to process urban ground feature data sets with huge points, wherein the calculating method is as follows.

Further, the data segmentation in the step 1 comprises the following steps:
because a number of points in each batch processed by a network is limited, using a simplified density clustering (DBSCAN) algorithm to cluster and segment the data according to the number of points, and then inputting the data into the network to process urban ground feature data sets with huge points, wherein the calculating method is as follows:

setting a set of points as R, wherein a coordinate of a first point is that $p_1=(x_1,y_1,z_1) \in R$ and a coordinate of the rest points are that $p_{R-1}=(x_{R-1},y_{R-1},z_{R-1}) \in R$, then a Euclidean distance from $p_{R-1}$ to $p_1$ is defined as:

$$d_{R-1}=\sqrt{(x_{R-1}-x_1)^2+(y_{R-1}-y_1)^2+(z_{R-1}-z_1)^2}$$

according to the distance $d_{R-i}$ from each sample point to $p_1$ and a number of points m in a segmentation region, dividing the field of $p_1$ into $\{p_1, p_1 \ldots, p_m\}$, and then calculating distances from the rest points in the set of points to a point $p_{m+1}$ iteratively until all the points in the set of points are divided.

Further, the PointEFF End-to-end feature extraction layer construction in the step 2 comprises the following steps:

the End-to-end feature extraction layer comprising a network encoder and a network decoder; processing and abstracting, by the encoder, a group of points through an abstract set operation to recursively extract multi-scale features of a point cloud local region; gradually recovering, by the decoder, a spatial dimension through a feature propagation operation, fusing the features extracted in the coding process, and completing input and output of same scales on the premise of reducing information loss as much as possible; and transferring, by the encoder and the decoder, features of the same scale through two groups of jump link modules;

the network encoder comprising thrice abstract set operations, wherein the abstract set consists of a sampling layer, a grouping layer and a feature extraction layer; firstly, inputting N LiDAR points with three-dimensional attributes (x, y, z) into the proposed PointEFF network, and selecting a point N' from the sampling layer selects by an iterative Farthest Point Sampling algorithm to define N' centroids of the local region; then, in the grouping layer, setting a radius r by a query ball algorithm, and searching adjacent k points in the centroid range r to construct a local region; after implementing the sampling layer and the grouping layer, sampling the LiDAR points into N' central clusters, each central cluster contains k points and 36-dimensional attributes thereof, and outputting a group of set of points with a size of N'×k×36; finally, encoding the local regions into feature vectors through the feature extraction layer; inputting the set of points into an MLP network, and outputting N'×k×C, wherein C is a feature extracted by MLP, max-pooling each central cluster to select the largest feature in each central cluster as a regional feature, and outputting N'×C;

carrying out thrice abstract set operations until a global feature of 1×1024 is output;

the network decoder consisting of thrice feature propagation operations and two groups of jump link modules, gradually recovering the spatial dimension by using an up-sampling operation, fusing the features extracted during the encoding process, and completing input and output of the same scale on the premise of reducing information loss as much as possible; in a feature propagation layer, in order to propagate learned features from a sampling point to an original point, interpolating an N'×C' dimensional feature map obtained by the encoder firstly by using an Inverse Distance Weighted algorithm, calculating distances from each point to be interpolated to all the points, calculating weights, and interpolating the number of points from N" to N' to obtain an interpolated N×C dimensional feature map; then linking, by the jump link modules, the C dimensional feature map obtained by the encoder at the same scale to obtain an N×(C'+C) Dimensional Feature Map; and Finally, obtaining an N×C''' dimensional feature map through the multi-layer perceptron (MLP); and obtaining an N×128 dimensional feature map after three feature propagation operations.

Further, the PointEFF External feature fusion layer construction in the step 3 comprises the following steps:

the External feature fusion layer comprising extraction of hand crafted descriptors and the External Feature Fusion module; and the method selecting a fast point feature histogram as an input of the External Feature Fusion module, wherein the steps of extracting the fast point feature histogram are as follows:

obtaining a normal of point cloud by plane fitting with least square method, and establishing a local coordinate system between two points according to obtained normal vectors:

$$\mu = \eta_s$$
$$\upsilon = \mu \times \frac{(p_t - p_s)}{\|p_t - p_s\|^2}$$
$$\omega = \mu \times \upsilon$$

a difference between point normal pairs being capable of being expressed by the following angles:

$$\alpha = \upsilon \cdot \eta_t$$
$$\phi = \mu \cdot \frac{(p_t - p_s)}{d}$$
$$\theta = \arctan(\omega \cdot \eta_t, \mu \cdot \eta_t)$$
$$d = \|p_t - p_s\|_2$$

quantizing the angles to form a point feature histogram (PFH);

representing features of the fast point feature histogram as:

$$FPFH(p_q) = PFH(p_q) + \frac{1}{k}\sum_{i=1}^{k} \frac{1}{\omega_k} \cdot PFH(p_k)$$

after obtaining a fast point cloud point feature histogram, transferring the N×128 dimensional feature map obtained from the End-to-end feature extraction layer and the N×33 dimensional feature histogram extracted by the hand-crafted descriptors into the External Feature Fusion module as inputs; in the External Feature Fusion module, the technical feature obtained from the End-to-end feature extraction layer being:

$$x \in R^{128}$$

the feature of the fast point feature histogram being:

$$y \cup R^{33}$$

a new feature histogram obtained by a concatenate operation being:

$$z=[x,y] \in R^{128+33}$$

after the concatenate operation is completed, obtaining the N×128 dimensional feature map through the multi-layer perceptron, wherein each point having 128 dimensional features; and Further, training data and test data are input to obtain a classification result and carry out precision evaluation, wherein OA, mIoU and Kappa coefficients, and F1–score are selected as evaluation indexes, and the calculating method is as follows:

$$OA = \frac{t_p + t_n}{t_p + t_n + f_p + f_n}$$

$$mIoU = \frac{t_p}{t_p + f_p + f_n}$$

$$p_e = \frac{(t_p + t_n) \times (t_p + f_p)}{(t_p + t_n + f_p + f_n)^2} + \frac{(t_n + f_p) \times (t_n + f_n)}{(t_p + t_n + f_p + f_n)^2}$$

$$\text{Kappa} = \frac{OA - p_e}{1 - p_e}$$

$$\text{precision} = \frac{t_p}{t_p + f_p}$$

$$\text{recall} = \frac{t_p}{t_p + f_n}$$

$$F1 - \text{score} = 2 \times \frac{\text{precision} \times \text{recall}}{\text{precision} + \text{recall}}$$

DETAILED DESCRIPTION

The present invention disclosure will be further illustrated below with reference to the accompany drawings and specific embodiments.

Under a Windows operating system, PyTorch is selected as a platform to build a PointEFF network, and effectiveness of the network is verified on an NMP3D Benchmark Suite data set.

The following steps are specifically comprised.

Figure 1:
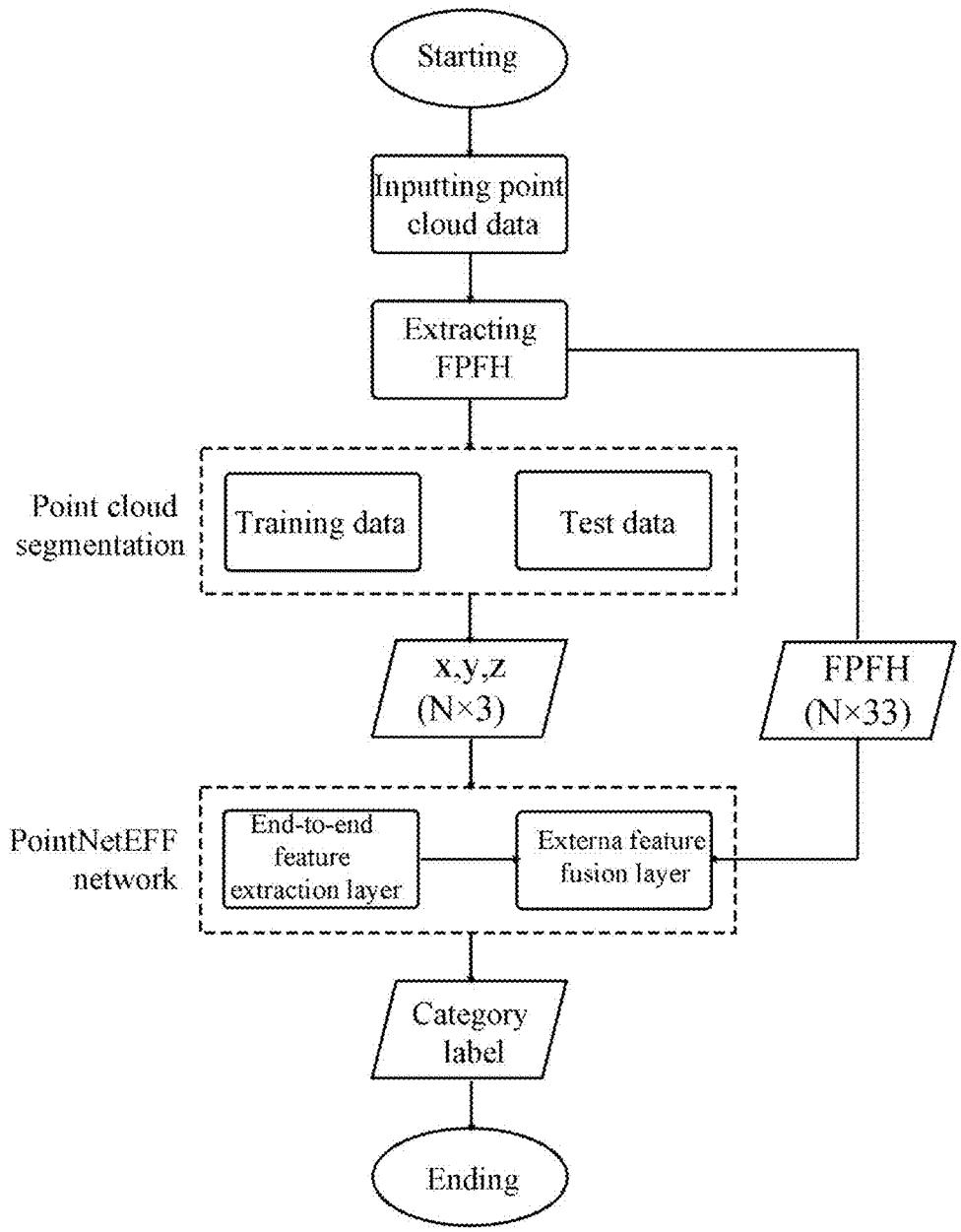
FIG. 1 is a technical flow chart of the present disclosure patent.
Figure 2:
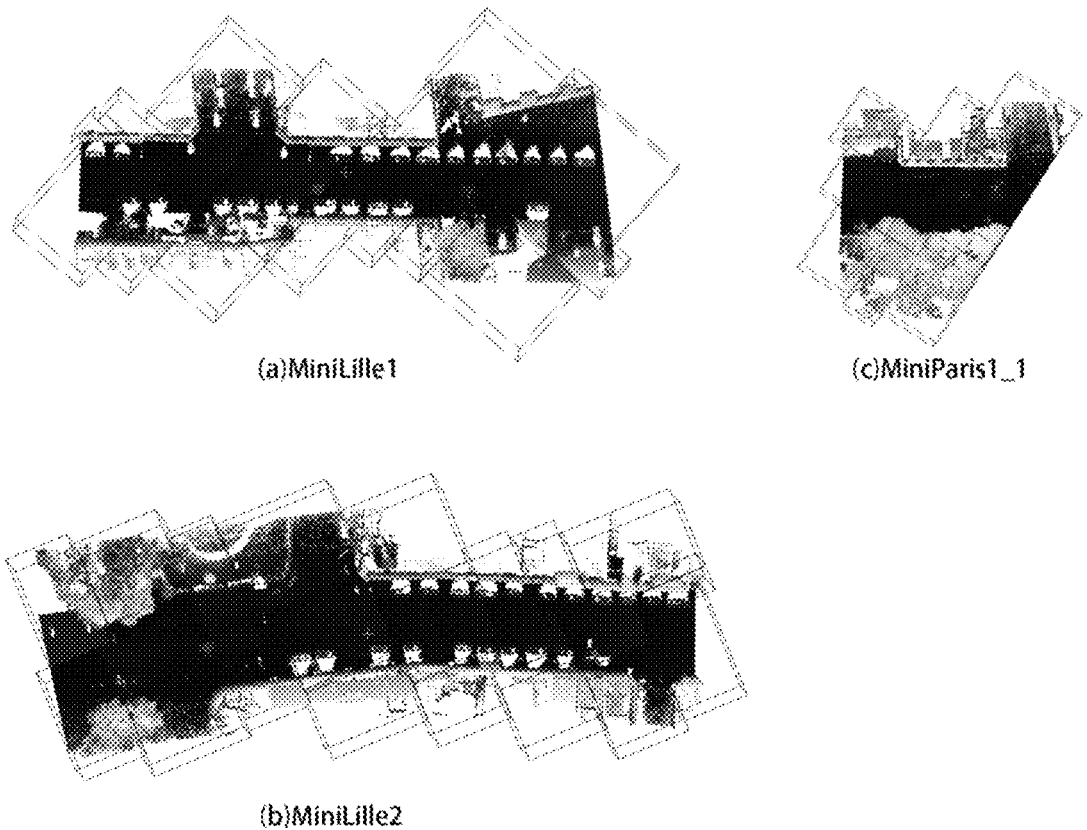
FIG. 2 is a situation map of training data segmentation.

At step 1, with reference to FIG. 1 and FIG. 2, point cloud segmentation and distributions of training data and test data are illustrated. The NMP3D data set is segmented into 83 training regions according to 10000 points, of which 60 regions in MiniLille1, MiniLille2 and MiniParis 1_1 are training data and 23 regions in MiniParis1_2 are test data.

Figure 3:
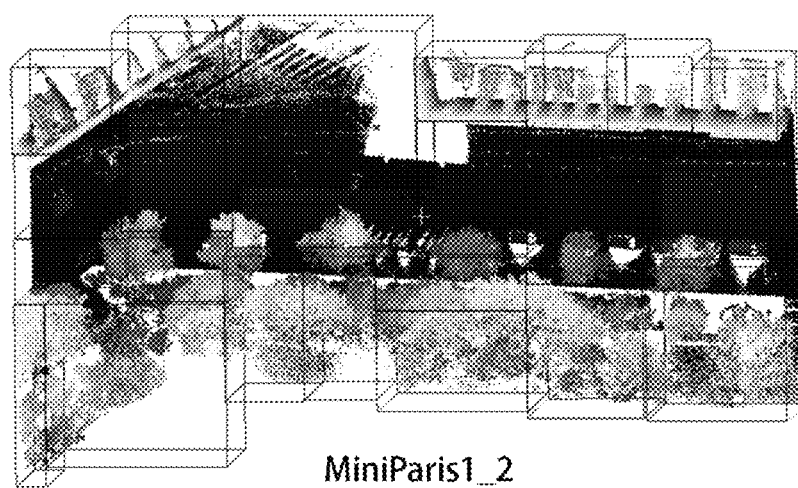
FIG. 3 is a situation map of test data segmentation.
Figure 4:
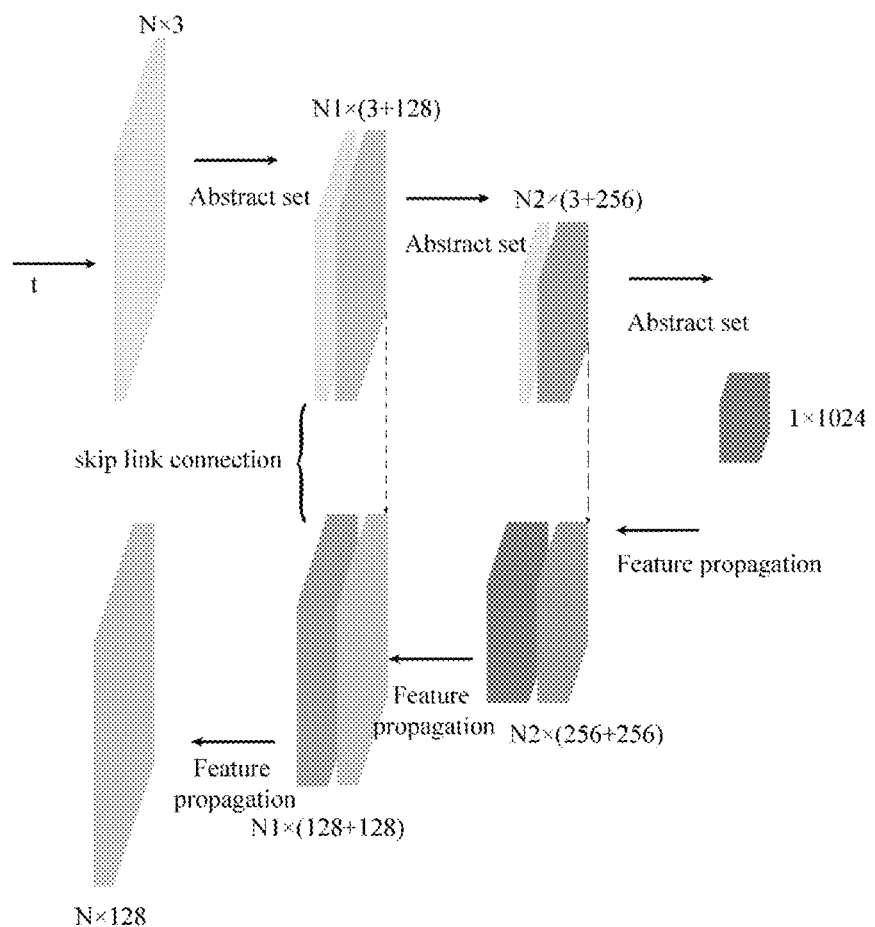
FIG. 4 is a structural drawing of a PointEFF End-to-end feature extraction layer.
Figure 5:
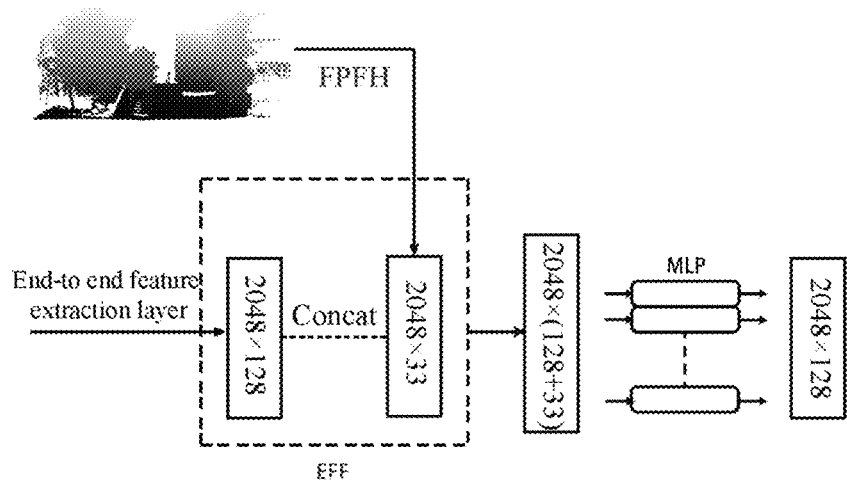
FIG. 5 is a structural drawing of a PointEFF External feature fusion layer.

At step 2, construction of an End-to-end feature extraction layer of the PointEFF network is illustrated with reference to FIG. 3. The End-to-end feature extraction layer consists of an encoder part and a decoder part, wherein the encoder part comprises thrice abstract set operations, while the decoder part comprises thrice feature propagation operations and two groups of jump link modules.

Setting N=2048, 2048 LiDAR points with three dimensional position attributes are input into the network, and 512 central points are selected by an iterative Farthest Point Sampling algorithm in a sampling layer. In a grouping layer, it is set that a query radius r=0.2 m, and a number of query points k=32, and 32 adjacent points within 0.2 m of the centroid are searched to construct a central cluster, and a 512×256 dimensional feature map is output through a feature extraction layer. The first abstraction set operation is completed.

For the 512×256 dimensional feature map obtained by the first abstraction set operation, 128 central points are selected by an iterative Farthest Point Sampling algorithm in the sampling layer. In the grouping layer, it is set that a query radius r=0.4 m, and a number of query points k=64, and 64 adjacent points within 0.4 m of the centroid are searched to construct a central cluster, and a 128×256 dimensional feature map is output through the feature extraction layer. The second abstraction set operation is completed.

The 128×256 dimensional feature map obtained by the second abstraction set operation is subjected to the third abstract set operation to finally obtain 1×1024 global region features. The network encoder part is designed.

In first feature propagation, firstly, the 1×1024 dimensional feature map obtained by the encoder is copied to obtain a 128×1024 dimensional feature map, then the 256 dimensional feature map obtained by the encoder at the same scale is linked by the jump link module to obtain a 128×(1024+256) dimensional feature map, and finally a 128×256 dimensional feature map is obtained by a multi-layer perceptron (MLP). The first feature propagation is completed.

In second feature propagation, the 128×256 dimensional feature map obtained in the first feature propagation layer is interpolated by using an Inverse Distance Weighted algorithm (IDW) to obtain a 512×256 dimensional feature map, and then the 128 dimensional feature map obtained by the encoder at the same scale is linked by the jump link module to obtain a 512×(256+128) dimensional feature map, and finally a 512×128 dimensional feature map is obtained by the multi-layer perceptron (MLP). The second feature propagation is completed.

In third feature propagation, the 512×128 dimensional feature map obtained in the second feature propagation layer is interpolated by using the Inverse Distance Weighted algorithm (IDW) to obtain a 2048×128 dimensional feature map, and finally a 2048×128 dimensional feature map is obtained by the multi-layer perceptron (MLP). The third feature propagation is completed. The network decoder part is designed.

At step 3, construction of an External feature fusion layer of the network is illustrated with reference to FIG. 3.

Under the Windows operating system, a Point Cloud Library (PCL) is selected as a platform to extract a fast point feature histogram. A radius is set to be 0.03 m and a normal of point cloud is calculated. On the basis of the normal of point cloud extracted, the radius is set to be 0.04 m, and the fast point feature histogram is calculated. The fast point feature histogram obtained by calculation is stored in a pcd document. Hand-crafted descriptors extraction is completed.

After the hand-crafted descriptors extraction is, the N×128 dimensional feature map obtained from the End-to-end feature extraction layer and the N×33 dimensional feature histogram are transferred into the External Feature Fusion module as inputs. In the External Feature Fusion module, an N×(128+33) dimensional feature map is obtained by concatenating and fusing the features obtained from the End-to-end feature extraction layer and the extracted manual design descriptors. After that, the fused feature map is used as an input of the multi-layer perceptron, and a 2048×128 dimensional feature map is obtained.

Finally, the feature map is input, a category label is obtained through one-dimensional convolution, and the classification is completed.

Figure 6:
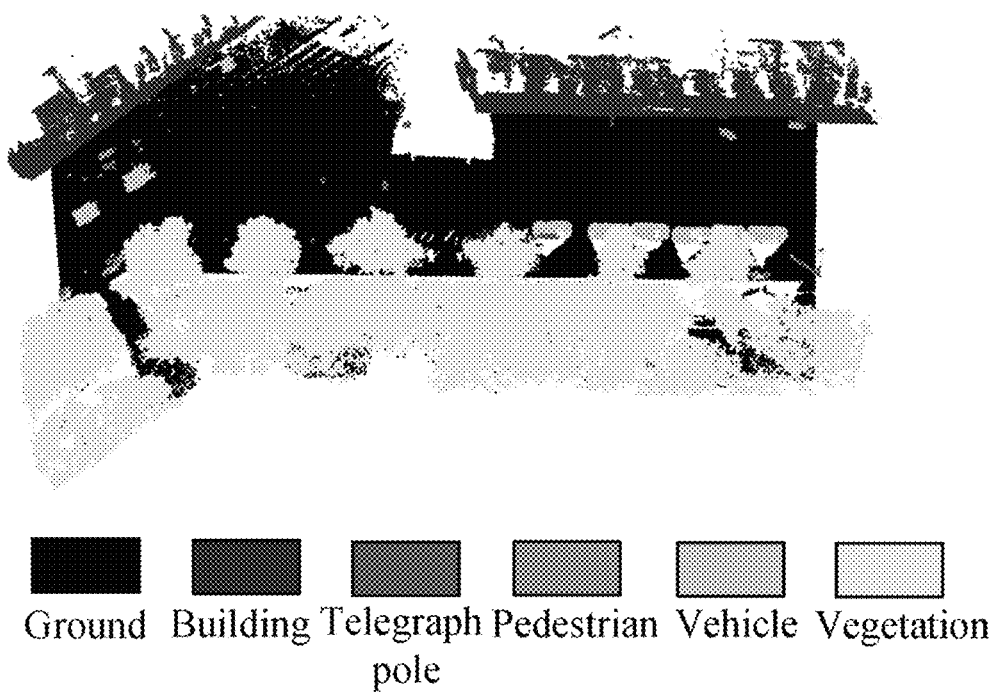
FIG. 6 is a classification result diagram of a PointEFF network.

At step 5, the PointEFF classification effects are illustrated with reference to FIG. 6.

The overall precision of the PointEFF classification is shown in Table 1, and the classification precision results of each category are shown in Table 2. It can be seen that most categories are correctly classified, especially in the classification of buildings and other scenes with rough surfaces.

TABLE 1

Overall precision results of PointEFF classification

| Evaluation index | OA (%) | MIoU (%) | F1-score (%) | Kappa (%) |
|---|---|---|---|---|
| PointEFF | 0.9792 | 0.7664 | 0.8455 | 0.9692 |

TABLE 2

Classification precision result of each category of PointEFF classification

| Category | Ground | Building | Telegraph pole | Pedestrian | Vehicle | Vegetation |
|---|---|---|---|---|---|---|
| PointEFF | 0.9894 | 0.9821 | 0.5233 | 0.4985 | 0.8518 | 0.9895 |

What is claimed is:

1. A PointEFF method for urban object classification with LiDAR point cloud data, comprising the following steps: step 1: segmenting point cloud data; step 2: constructing a PointEFF End-to-end feature extraction layer; step 3: constructing a PointEFF External feature fusion layer; and step 4: inputting data to obtain a point cloud category label for precision evaluation, wherein:

the End-to-end feature extraction layer is constructed according to the following steps:

the End-to-end feature extraction layer comprising a network encoder and a network decoder; processing and abstracting, by the encoder, a group of points through an abstract set operation to recursively extract multi-scale features of a point cloud local region; gradually recovering, by the decoder, a spatial dimension through a feature propagation operation, fusing the features extracted in the coding process, and completing input and output of the same scale on the premise of reducing information loss; and transferring, by the encoder and the decoder, features of the same scale through two groups of jump link modules;

the network encoder comprising thrice abstract set operations, wherein the abstract set consists of a sampling layer, a grouping layer and a feature extraction layer; firstly, inputting N LiDAR points with three-dimensional attributes (x, y, z) into the network, and selecting a point N' from the sampling layer by an iterative Farthest Point Sampling algorithm to define N' centroids of the local region;

then, in the grouping layer, setting a radius r by a query ball algorithm, and searching adjacent k points in the centroid range r to construct a local region; after implementing the sampling layer and the grouping layer, sampling the LiDAR points into N' central clusters, each central cluster contains k points and 36-dimensional attributes thereof, and outputting a group of set of points with a size of N'×k×36; finally, encoding the local regions into feature vectors through the feature extraction layer; inputting the set of points into an MLP network, and outputting N'×k×C, wherein C is a feature extracted by MLP, max-pooling each central cluster to select the largest feature in each central cluster as a regional feature, and outputting N'×C;

carrying out thrice abstract set operations until a global feature of 1×1024 is output;

the network decoder consisting of thrice feature propagation operations and two groups of jump link modules, gradually recovering the spatial dimension by using an up-sampling operation, fusing the features extracted during the encoding process, and completing input and output of the same scale on the premise of reducing information loss; in a feature propagation layer, in order to propagate learned features from a sampling point to an original point, interpolating an N"×C' dimensional feature map obtained by the encoder firstly by using an Inverse Distance Weighted algorithm, calculating distances from each point to be interpolated to all the points, calculating weights, and interpolating the number of points from N" to N' to obtain an interpolated N'×C' dimensional feature map; then linking, by the jump link modules, the C dimensional feature map obtained by the encoder at the same scale to obtain an N'×(C' +C) dimensional feature map through dimensional feature map; and finally, obtaining an N' ×C''' the multi-layer perceptron; and obtaining an N×128 dimensional feature map after three feature propagation operations;

the PointEFF External feature fusion layer is constructed according to the following steps:

the External feature fusion layer comprising extraction of hand-crafted descriptors and the External Feature Fusion module; and selecting a fast point feature histogram as an input of the External Feature Fusion module;

obtaining a normal of point cloud by plane fitting with least square method, and establishing a local coordinate system between two points according to obtained normal vectors:

$$\mu = \eta_s$$
$$v = \mu \times \frac{(p_t - p_s)}{\|p_t - p_s\|^2}$$
$$\omega = \mu \times v$$

a difference between point normal pairs being capable of being expressed by the angles α, φ and θ:

$$\alpha = v \cdot \eta_t$$
$$\phi = \mu \cdot \frac{(p_t - p_s)}{d}$$
$$\theta = \arctan(\omega \cdot \eta_t, \mu \cdot \eta_t)$$
$$d = \|p_t - p_s\|_2$$

quantizing the angles α, φ and θ to form a point feature histogram PFH;

representing features of the fast point feature histogram as:

$$FPFH(p_q) = PFH(p_q) + \frac{1}{k}\sum_{i=1}^{k}\frac{1}{\omega_k} \cdot PFH(p_k)$$

after obtaining a fast point cloud point feature histogram, transferring the N×128 dimensional feature map obtained from the End-to-end feature extraction layer and the N×33 dimensional feature histogram into the External Feature Fusion module as inputs; in the External Feature Fusion module, the technical feature obtained by the End-to-end feature extraction layer being:

$x \in R^{128}$ the feature of the fast point feature histogram being:

$y \in R^{33}$ a new feature histogram obtained by a concatenate operation being:

$z = [x, y] \in R^{128+33}$ after the concatenate operation is completed, obtaining the N×128 dimensional feature map through the multilayer perceptron, that is, each point having 128 dimensional features; and finally, inputting the feature map, and obtaining a point cloud category label through one-dimensional convolution, thus completing the PointEFF method for urban object classification with LiDAR point cloud data.

2. The PointEFF method for urban object classification with LiDAR point cloud data according to claim 1, wherein the point cloud data is segmented according to the following steps:

setting a set of points as R, wherein a first point is $p_1=(x_1, y_1, z_1) \in R$, and the rest points are $p_{R-1}=(x_{R-1}, y_{R-1}, z_{R-1}) \in R$, and a Euclidean distance from $p_{R-1}$ to $p_1$ is:

$d_{R-1} = \sqrt{(x_{R-1}-x_1)^2 + (y_{R-1}-y_1)^2 + (z_{R-1}-z_1)^2}$ according to the Euclidean distance from each sample point to $p_1$ and a number of points m in a segmentation region, dividing a field of $p_1$ as $\{p_1, p_1 \ldots, p_m\}$ and then calculating distances from the rest points in the set of points to a point $p_{m+1}$ iteratively until all the points in the set of points are divided.

* * * * *